United States Patent
Zhou

(10) Patent No.: US 12,438,145 B2
(45) Date of Patent: *Oct. 7, 2025

(54) ELECTROCHEMICAL APPARATUS AND ELECTRONIC APPARATUS INCLUDING SAME

(71) Applicant: Ningde Amperex Technology Limited, Fujian (CN)

(72) Inventor: Molin Zhou, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,907

(22) Filed: Apr. 25, 2024

(65) Prior Publication Data

US 2024/0274796 A1    Aug. 15, 2024

Related U.S. Application Data

(63) Continuation of application No. PCT/CN2022/075970, filed on Feb. 11, 2022.

(30) Foreign Application Priority Data

Oct. 25, 2021    (WO) ............... PCT/CN2021/126213

(51) Int. Cl.
| | |
|---|---|
| *H01M 4/36* | (2006.01) |
| *H01M 4/02* | (2006.01) |
| *H01M 4/131* | (2010.01) |
| *H01M 4/136* | (2010.01) |
| *H01M 4/505* | (2010.01) |
| *H01M 4/58* | (2010.01) |
| *H01M 10/0525* | (2010.01) |
| *H01M 10/0567* | (2010.01) |

(52) U.S. Cl.
CPC ........... *H01M 4/364* (2013.01); *H01M 4/131* (2013.01); *H01M 4/136* (2013.01); *H01M 4/505* (2013.01); *H01M 4/5825* (2013.01); *H01M 10/0525* (2013.01); *H01M 10/0567* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| 10,062,902 | B2 | 8/2018 | Jeong et al. | |
|---|---|---|---|---|
| 11,114,663 | B2* | 9/2021 | Dai | ........................ C01G 51/00 |
| 12,218,312 | B2* | 2/2025 | Suzuki | .................. H01M 4/382 |
| 12,308,428 | B2* | 5/2025 | Zhou | ..................... H01M 4/366 |
| 12,327,864 | B2* | 6/2025 | Zhou | ................. H01M 10/4235 |
| 2014/0170492 | A1* | 6/2014 | Xia | ........................ H01M 4/505 |
| | | | | 429/219 |
| 2014/0322605 | A1 | 10/2014 | Oh et al. | |
| 2020/0006769 | A1* | 1/2020 | Paulsen | ................. H01M 4/525 |
| 2021/0151752 | A1* | 5/2021 | Park | ................... H01M 10/052 |
| 2021/0226201 | A1* | 7/2021 | Lim | ...................... H01M 4/0428 |
| 2021/0280863 | A1* | 9/2021 | Liu | .................... H01M 10/0525 |
| 2022/0158251 | A1* | 5/2022 | Lee | ....................... H01M 50/121 |
| 2022/0190316 | A1* | 6/2022 | Seo | ......................... C01G 53/50 |
| 2022/0216460 | A1* | 7/2022 | Kuroda | ................. H01M 4/525 |
| 2022/0223862 | A1* | 7/2022 | Wu | ......................... H01M 4/131 |
| 2022/0223904 | A1* | 7/2022 | Choi | .................... C01G 25/006 |
| 2022/0310988 | A1* | 9/2022 | Zhou | ................. H01M 10/0525 |
| 2022/0310998 | A1* | 9/2022 | Zhou | ...................... H01M 4/525 |
| 2022/0407064 | A1* | 12/2022 | Seo | ........................ H01M 4/505 |
| 2022/0411284 | A1* | 12/2022 | Seo | ....................... H01M 4/131 |
| 2022/0416240 | A1* | 12/2022 | Seo | ......................... H01M 4/131 |
| 2023/0053984 | A1* | 2/2023 | Seo | ........................ H01M 4/505 |
| 2023/0197959 | A1* | 6/2023 | Dong | .................... H01M 4/485 |
| | | | | 429/221 |
| 2024/0234707 | A1* | 7/2024 | Kim | ...................... H01M 4/505 |
| 2024/0282949 | A1* | 8/2024 | Zhou | ..................... H01M 4/505 |
| 2024/0282960 | A1* | 8/2024 | Zhou | ..................... H01M 4/623 |
| 2024/0363856 | A1* | 10/2024 | Li | ........................ H01M 4/5825 |

FOREIGN PATENT DOCUMENTS

| CN | 1771618 | A | 5/2006 |
|---|---|---|---|
| CN | 105470494 | A | 4/2016 |
| CN | 106299502 | A | 1/2017 |
| CN | 107706351 | A | 2/2018 |
| CN | 110010848 | A | 7/2019 |
| CN | 110265627 | A | 9/2019 |
| CN | 110265627 | B | 9/2020 |

(Continued)

OTHER PUBLICATIONS

Derwent Abstract of JP 2012-2044307 A (2012) (Year: 2012).*

(Continued)

*Primary Examiner* — Kevin M Bernatz

(74) *Attorney, Agent, or Firm* — Maier & Maier, PLLC

(57) ABSTRACT

An electrochemical apparatus includes a positive electrode, a negative electrode, a separator, and an electrolyte. The positive electrode includes a first positive electrode material and a second positive electrode material. The first positive electrode material has good cycling stability and high initial coulombic efficiency, and the second positive electrode material has a high specific capacity and low initial coulombic efficiency during the first charge. This can compensate for the active lithium loss caused by the formation of SEI.

20 Claims, 1 Drawing Sheet

(56) References Cited

FOREIGN PATENT DOCUMENTS

JP          2012204307  A  *  10/2012

OTHER PUBLICATIONS

Derwent Abstract of CN 104009228 A (2014) (Year: 2014).*
Derwent Abstract of CN 114744290 A (2022) (Year: 2022).*
International Search Report issued on May 9, 2022, in corresponding International Patent Application No. PCT/CN2022/075970, 5 pages.
Extended Search Report issued on Feb. 3, 2025, in corresponding European Application No. 22884905.5, 7 pages.
Office Action issued on Apr. 19, 2025, in corresponding Chinese Application No. 202280002000.8, 12 pages.

* cited by examiner

ELECTROCHEMICAL APPARATUS AND ELECTRONIC APPARATUS INCLUDING SAME

CROSS REFERENCE TO RELATED APPLICATIONS

This application is a continuation application of PCT/CN2022/075970, filed on Feb. 11, 2022, which claims priority of international application No. PCT/CN2021/126213, filed on Oct. 25, 2021, the disclosure of which is hereby incorporated by reference in its entirety.

TECHNICAL FIELD

This application relates to the field of energy storage, specifically to an electrochemical apparatus and an electronic apparatus including the same, and in particular to a lithium-ion battery.

BACKGROUND

In recent years, with the continuous expansion of the battery industrialization scale and the development of related technologies, the energy density of lithium-ion batteries has received increasing attention and challenges. In a first charge and discharge process of a lithium-ion secondary battery, a solid electrolyte interface (SEI) is formed on a surface of a negative electrode, causing irreversible capacity loss and reducing the energy density of the lithium-ion energy storage device. In a lithium-ion energy storage device with a graphite negative electrode, about 10% of the active lithium source is consumed in the first cycle. When a negative electrode is made of a negative electrode material with a high specific capacity, such as alloys (silicon-alloy, tin-alloy, and the like), oxides (silicon oxide and tin oxide), and amorphous carbon, much more of the active lithium source is consumed. Therefore, appropriate lithium supplementation methods are of great significance for further increasing the energy density of the lithium-ion energy storage device.

SUMMARY

This application provides an electrochemical apparatus and an electronic apparatus with improved cycling performance and increased energy density, to resolve the problem in the prior art to some extent.

In an embodiment, this application provides an electrochemical apparatus. The electrochemical apparatus includes a positive electrode, a negative electrode, and an electrolyte. The positive electrode includes a positive electrode current collector and a positive electrode material layer on at least one surface of the positive electrode current collector. The positive electrode material layer includes a first positive electrode material shown in Formula (I):

$$Li_{1+x}Fe_yMn_zM_{1-y-z}PO_{4-t}A_t, \qquad \text{Formula (I)}$$

$-0.1<x<0.1$, $0<y\leq 1$, $0\leq z\leq 1$, $0<y+z\leq 1$, $0\leq t<0.2$, M includes at least one of Ti, Zr, V, or Cr, and A includes at least one of S, N, F, Cl, or Br; and a second positive electrode material shown in Formula (II);

$$Li_{1+r}Mn_{1-p}X_pO_{2-s}T_s, \qquad \text{Formula (II)}$$

$-0.1<r<0.2$, $0\leq p<0.2$, $0\leq s<0.2$, X includes at least one of Fe, Co, Ni, Ti, Zn, Mg, Al, V, Cr, or Zr, and T includes at least one of S, N, F, Cl, or Br; and the positive electrode satisfies Formula (1):

$$0.5 \leq R \times P/Q \leq 16, \qquad \text{Formula (1)}$$

where

R represents a resistance of the positive electrode in unit of $\Omega$; P represents a compacted density of the positive electrode in unit of $g/cm^3$; and Q represents a single-sided surface density of the positive electrode in unit of $g/1540.25\ mm^2$.

In some embodiments, the positive electrode satisfies Formula (2): $1.5 \leq R \times P/Q \leq 10$ Formula (2).

In some embodiments, $R \leq 3.5\Omega$.

In some embodiments, $1.6\ g/cm^3 < P < 2.6\ g/cm^3$.

In some embodiments, $0.16\ g/1540.25\ mm^2 < Q < 0.45\ g/1540.25\ mm^2$.

In some embodiments, a mass ratio of the first positive electrode material to the second positive electrode material is 5:1 to 99:1.

In some embodiments, based on a total mass of the positive electrode material layer, a percentage of the first positive electrode material is 80% to 98%.

In some embodiments, the second positive electrode material has a characteristic diffraction peak A in an X-ray diffraction pattern in a range of 15° to 16° and/or a characteristic diffraction peak B in a range of 18° to 19°, and a ratio of $I_A/I_B$ of an intensity $I_A$ of the characteristic diffraction peak A to an intensity $I_B$ of the characteristic diffraction peak B satisfies Formula (3):

$$0 < I_A/I_B \leq 0.2. \qquad \text{Formula (3)}$$

In some embodiments, in the X-ray diffraction pattern of the second positive electrode material after the first cycle of charge, the characteristic diffraction peak A and the characteristic diffraction peak B both shift toward lower angles, with a shift magnitude less than 0.5°.

In some embodiments, the electrolyte includes vinyl carbonate, where based on a total mass of the electrolyte, a percentage of the vinyl carbonate is 0.05% to 5%.

In another embodiment, this application provides an electronic apparatus, including the electrochemical apparatus described according to some embodiments of this application.

This application provides a lithium-ion secondary battery including a positive-electrode lithium-supplementing material. In one aspect, a surface of the second positive electrode material used in this application has a small amount of free lithium and good processing performance. In addition, this material has a higher specific capacity than the first positive electrode material and can release a large amount of lithium ions during the first charge to supplement active lithium. A combination of this material and the first positive electrode material can effectively improve the energy density and cycle life of the battery. In a second aspect, the comprehensive design of the sheet resistance, compacted density, and surface density of the positive electrode in this application can significantly improve the cycle life and energy density of the lithium-ion secondary battery. In a third aspect, the additive vinyl carbonate is added into the electrolyte, allowing the negative electrode to form a more uniformly dense SEI film and inhibiting the continuous loss of the active lithium, thus further prolonging the cycle life of the lithium-ion secondary battery.

Additional aspects and advantages of this application are partially described and presented in subsequent descriptions, or explained through implementation of some embodiments of this application.

DETAILED DESCRIPTION

Figure 1:
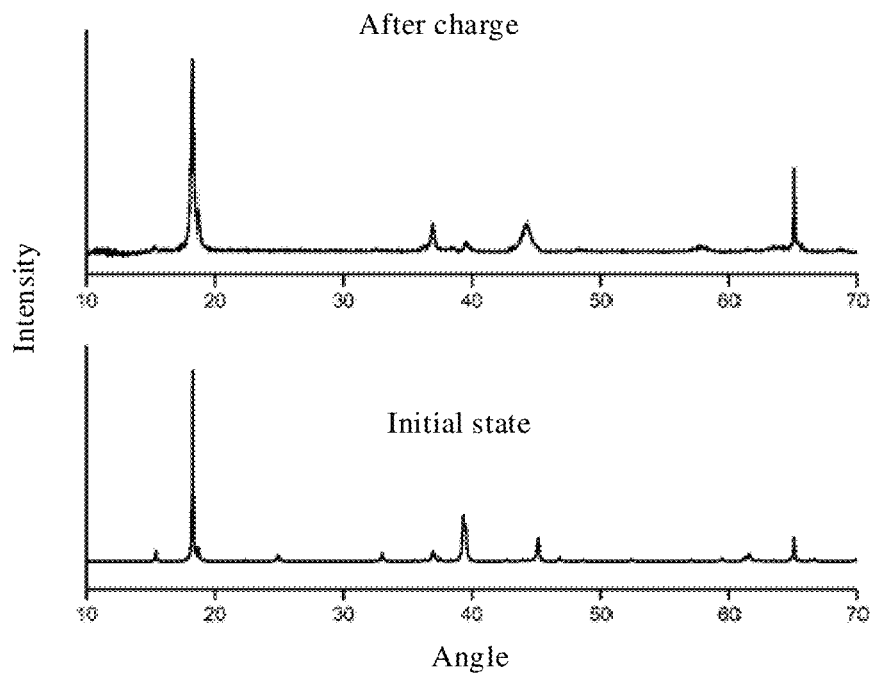
FIG. 1 is an XRD pattern of a second positive electrode material in Example 1 before and after a first cycle of charge.
Figure 2:
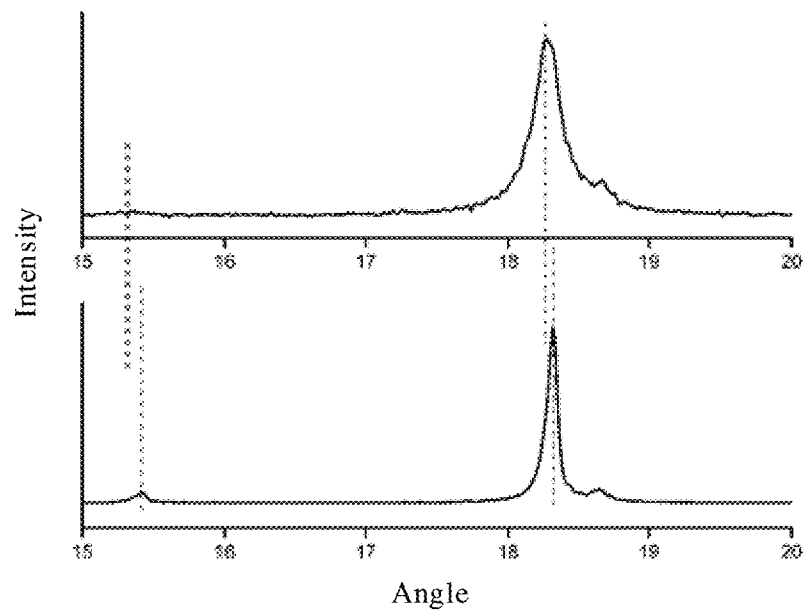
FIG. 2 is a locally enlarged view of FIG. 1.

Some embodiments of this application are described in detail below. Some embodiments of this application should not be construed as limitations on the application.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range are clearly designated.

In specific embodiments and claims, a list of items connected by the terms "one of", "one piece of", "one kind of" or other similar terms may mean any one of the listed items. For example, if items A and B are listed, the phrase "one of A and B" means only A or only B. In another example, if items A, B, and C are listed, the phrase "one of A, B, and C" means only A, only B, or only C. The item A may include a single element or a plurality of elements. The item B may include a single element or a plurality of elements. The item C may include a single element or a plurality of elements.

In the specific embodiments and claims, an item list connected by the terms "at least one of", "at least one piece of", "at least one kind of" or other similar terms may mean any combination of the listed items. For example, if items A and B are listed, the phrase "at least one of A and B" means only A; only B; or A and B. In another example, if items A, B, and C are listed, the phrase "at least one of A, B, or C" means only A; only B; only C; A and B (exclusive of C); A and C (exclusive of B); B and C (exclusive of A); or all of A, B, and C. The item A may include a single element or a plurality of elements. The item B may include a single element or a plurality of elements. The item C may include a single element or a plurality of elements.

I. Electrochemical Apparatus

In some embodiments, this application provides an electrochemical apparatus. The electrochemical apparatus includes a positive electrode, a negative electrode, and an electrolyte.

1. Positive Electrode

In some embodiments, the positive electrode includes a positive electrode current collector and a positive electrode material layer on at least one surface of the positive electrode current collector, and the positive electrode material layer includes a first positive electrode material shown in Formula (I):

$$Li_{1+x}Fe_yMn_zM_{1-y-z}PO_{4-t}A_t,$$    Formula (I)

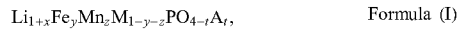

$-0.1 < x < 0.1$, $0 < y \leq 1$, $0 \leq z \leq 1$, $0 < y+z \leq 1$, $0 \leq t < 0.2$, M includes at least one of Ti, Zr, V, or Cr, and A includes at least one of S, N, F, Cl, or Br; and a second positive electrode material shown in Formula (II);

$$Li_{1+r}Mn_{1-p}X_pO_{2-s}T_s,$$    Formula (II)

$-0.1 < r < 0.2$, $0 \leq p < 0.2$, $0 \leq s < 0.2$, X includes at least one of Fe, Co, Ni, Ti, Zn, Mg, Al, V, Cr, or Zr, and T includes at least one of S, N, F, Cl, or Br; and the positive electrode satisfies Formula (1):

$$0.5 \leq R \times P/Q \leq 16,$$    Formula (1)

where

R represents a resistance of the positive electrode in unit of Ω; P represents a compacted density of the positive electrode in unit of g/cm³; and Q represents a single-sided surface density of the positive electrode in unit of g/1540.25 mm².

In this specification, the calculation of R·P/Q involves only numerical calculation. For example, if the resistance R of the positive electrode is 0.5 Ω, the compacted density P is 2.2 g/cm³, and the single-sided surface density Q of the positive electrode is 0.3 g/1540.25 mm², R·P/Q=3.7.

The resistance R of the positive electrode is a resistance value measured using the direct-current two-probe method, where a contact area between the probe and the positive electrode is 49 πmm². For example, upper and lower sides of the positive electrode are clamped between two conductive terminals of an electrode plate resistance tester and then fixed by applying pressure. The diameter of the conductive terminals is 14 mm, and the applied pressure is 15 MPa to 27 MPa. The positive electrode resistance tester is a HIOKI BT23562 internal resistance tester.

The compacted density of the positive electrode can be calculated according to a formula: P=m/v, where m represents a weight of the positive electrode material layer in unit of g; and v represents a volume of the positive electrode material layer in unit of cm³. The volume v of the positive electrode material layer may be a product of the area Ar of the positive electrode material layer and the thickness of the positive electrode material layer.

The single-sided surface density Q of the positive electrode can be calculated according to a formula: Q=1540.25 m/Ar, where m represents a weight of the positive electrode material layer in unit of g; and Ar represents an area of the positive electrode material layer in unit of mm².

In some embodiments, the positive electrode material layer is located on a surface of the positive electrode current collector. In some embodiments, the positive electrode material layer is located on both surfaces of the positive electrode current collector.

In some embodiments, the first positive electrode material includes at least one of $LiFePO_4$, $LiFe_{0.5}Mn_{0.5}PO_4$, $Li_{0.9}Fe_{0.5}Mn_{0.45}Ti_{0.05}PO_4$, $Li_{0.9}Fe_{0.5}Mn_{0.45}Ti_{0.04}Zr_{0.01}PO_4$, or $Li_{0.95}FePO_{3.95}F_{0.05}$. In some embodiments, the second positive electrode material includes at least one of $LiMnO_2$, $LiMn_{0.9}Ni_{0.1}O_2$, $LiMn_{0.9}Ni_{0.05}Cr_{0.05}O_2$, $Li_{0.95}MnO_{1.95}F_{0.05}$, $Li_{0.95}MnO_{1.9}S_{0.05}F_{0.05}$.

In some embodiments, $1.5 \leq R \times P/Q \leq 10$. In some embodiments, a value of RxP/Q is 0.5, 1, 1.5, 2, 2.5, 3, 3.5, 4, 5, 6, 7, 8, 9, 10, 11, 12, 13, 14, 15, 16, or in a range defined by any two of these values.

In some embodiments, $R<3.5\Omega$. In some embodiments, R is $0.2 \Omega$, $0.5 \Omega$, $1 \Omega$, $1.2 \Omega$, $1.5 \Omega$, $1.8 \Omega$, $2.0 \Omega$, $2.2 \Omega$, $2.5 \Omega$, $3.0 \Omega$, $3.2 \Omega$, $3.5\Omega$, or in a range defined by any two of these values. R being in the foregoing range is conducive to improving the cycling performance and rate performance of the lithium-ion secondary battery.

In some embodiments, $1.6$ g/cm$^3$ $<P<2.6$ g/cm$^3$. In some embodiments, P is 1.6 g/cm$^3$, 1.8 g/cm$^3$, 2.0 g/cm$^3$, 2.2 g/cm$^3$, 2.4 g/cm$^3$, 2.6 g/cm$^3$, or in a range defined by any two of these values. P being in the foregoing range is conducive to migration of electrons and ions in the positive electrode, thus improving the cycling performance of the lithium-ion secondary battery.

In some embodiments, 0.16 g/1540.25 mm$^2$ $<Q<0.45$ g/1540.25 mm$^2$. In some embodiments, Q is 0.16 g/1540.25 mm$^2$, 0.18 g/1540.25 mm$^2$, 0.2 g/1540.25 mm$^2$, 0.25 g/1540.25 mm$^2$, 0.28 g/1540.25 mm$^2$, 0.30 g/1540.25 mm$^2$, 0.34 g/1540.25 mm$^2$, 0.36 g/1540.25 mm$^2$, 0.38 g/1540.25 mm$^2$, 0.40 g/1540.25 mm$^2$, 0.42 g/1540.25 mm$^2$, 0.45 g/1540.25 mm$^2$, or in a range defined by any two of these values. Q being in the foregoing range can improve the cycling performance and rate performance of the lithium-ion secondary battery under the premise of ensuring charge/discharge capacity.

In some embodiments, a mass ratio of the first positive electrode material to the second positive electrode material is 5:1 to 99:1. In some embodiments, the mass ratio of the first positive electrode material to the second positive electrode material is 5:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1, 99:1, or in a range defined by any two of these values. When the mass ratio of the first positive electrode material to the second positive electrode material is in the foregoing range, the positive electrode includes the first positive electrode material of high concentration, allowing for higher structural stability of the positive electrode. This can alleviate capacity loss and impedance increase caused by damage to the positive electrode material structure, thus maintaining cycling stability and kinetic performance of the lithium-ion battery.

In some embodiments, based on a total mass of the positive electrode material layer, a percentage of the first positive electrode material is 80% to 98%. In some embodiments, based on the total mass of the positive electrode material layer, the percentage of the first positive electrode material is 80%, 82%, 84%, 85%, 88%, 90%, 92%, 94%, 96%, 98%, or in a range defined by any two of these values.

In some embodiments, the second positive electrode material has a characteristic diffraction peak A in an X-ray diffraction pattern in a range of 15° to 16° and/or a characteristic diffraction peak B in a range of 18° to 19°, and a ratio of $I_A/I_B$ of an intensity $I_A$ of the characteristic diffraction peak A to an intensity $I_B$ of the characteristic diffraction peak B satisfies Formula (3):

$$0 < I_A/I_B \leq 0.2. \qquad \text{Formula (3)}$$

In some embodiments, the value of $I_A/I_B$ is 0.1, 0.12, 0.14, 0.16, 0.18, 0.2, or in a range defined by any two of these values.

In some embodiments, in the X-ray diffraction pattern of the second positive electrode material after the first cycle of charge, the characteristic diffraction peak A and the characteristic diffraction peak B both shift toward lower angles, with a shift magnitude less than 0.5°. In some embodiments, the shift magnitude is 0.1°, 0.2°, 0.3°, 0.4°, 0.45°, or in a range defined by any two of these values.

In some embodiments, the positive electrode material layer includes a conductive agent. In some embodiments, the conductive agent includes at least one of graphite, superconducting carbon, acetylene black, carbon black, Ketjen black, carbon dots, carbon nanotubes, graphene, or carbon nanofiber.

In some embodiments, based on a total mass of the positive electrode material layer, a percentage of the conductive agent is 0.5% to 20%. In some embodiments, based on the total mass of the positive electrode material layer, the percentage of the conductive agent is 0.5%, 1%, 5%, 8%, 10%, 12%, 14%, 16%, 18%, 20%, or in a range defined by any two of these values.

In some embodiments, the positive electrode material layer includes a binder. In some embodiments, the binder includes at least one of styrene-butadiene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA), or polyvinyl alcohol (PVA).

In some embodiments, based on a total mass of the positive electrode material layer, a percentage of the binder is 0.1% to 2.5%. In some embodiments, based on the total mass of the positive electrode material layer, the percentage of the binder is 0.1%, 0.2%, 0.5%, 0.8%, 1%, 1.2%, 1.5%, 1.8%, 2%, 2.5%, or in a range defined by any two of these values.

In some embodiments, the positive electrode current collector may be a metal foil or a porous metal plate. In some embodiments, the positive electrode current collector includes a foil or a porous plate of metal such as aluminum, copper, nickel, titanium, or silver or their alloys. In some embodiments, the positive electrode current collector includes at least one of a copper foil or an aluminum foil.

In some embodiments, thickness of the positive electrode current collector is 5 μm to 20 μm. In some embodiments, the thickness of the positive electrode current collector is 5 μm, 8 μm, 10 μm, 12 μm, 15 μm, 18 μm, 20 μm, or in a range defined by any two of these values.

In some embodiments, the positive electrode may be obtained by using the following method: mixing the positive electrode active material, the conductive agent, and the binder in a solvent to prepare an active material compound, and applying the active material compound on the current collector. In some embodiments, the solvent may include N-methylpyrrolidone or the like, but is not limited thereto.

The positive electrode of this application can fully exert a synergistic effect between the first positive electrode material and the second positive electrode material. During the first cycle of charge, because the second positive electrode material features a high specific capacity and low initial coulombic efficiency during the first charge, active lithium loss caused by the formed SEI is effectively compensated for. Thus, during the first discharge, there are enough lithium ions being intercalated back into the first positive electrode material, effectively increasing the energy density of the battery. In addition, the first positive electrode material used in this application has a stable structure, a small change in volume during charge and discharge, and good cycling stability. Furthermore, the design of the sheet resistance, compacted density, and surface density of the positive electrode can further increase the energy density of the lithium-ion secondary battery, improve the rate performance, and prolong the cycle life. Therefore, the use of the positive electrode of this application allows the lithium-ion secondary battery to have high energy density, good rate performance, and long cycle life.

It should be noted that the sheet resistance, compacted density, and single-sided surface density of the positive electrode are key parameters for designing and manufacturing the lithium-ion secondary battery. An excessively large sheet resistance of the positive electrode deteriorates the cycling performance and rate performance of the lithium-ion secondary battery. An excessively large or small compacted density worsens the cycling performance and rate performance of the battery. An excessively large single-sided surface density of the positive electrode reduces the cycle life of the battery and affects the infiltration of the electrolyte, thus affecting the rate performance of the battery, especially reducing the discharge capacity of the battery at a high rate. An excessively small single-sided surface density of the positive electrode increases, with the same battery capacity, the lengths of the current collector and separator as well as the ohmic internal resistance of the battery.

In this application, in the case that the positive electrode includes both the first positive electrode material and the second positive electrode material, the comprehensive design of parameters such as the sheet resistance, compacted density, and single-sided surface density of the positive electrode allows the electrochemical performance of the lithium-ion secondary battery to achieve the expected result.

2. Electrolyte

In some embodiments, the electrolyte used in the electrochemical apparatus of this application includes an electrolytic salt and a solvent for dissolving the electrolytic salt. In some embodiments, the electrolyte includes an additive, and the additive includes vinyl carbonate, where based on a total mass of the electrolyte, a percentage of the vinyl carbonate is 0.05% to 5%.

In some embodiments, the percentage of the vinyl carbonate is 0.05%, 1%, 2%, 3%, 4%, 5%, or in a range defined by any two of these values.

When the percentage of the additive in the electrolyte is in the range of this application, the cycling performance of the lithium-ion secondary battery can be further improved and the energy density can be further increased.

In some embodiments, the electrolyte may further include another additive, which can be arbitrarily used as an additive of the lithium-ion secondary battery. This is not specifically limited by this application and can be selected based on actual requirements. In some embodiments, the another additive includes at least one of vinyl ethylene carbonate (VEC), succinonitrile (SN), adiponitrile (AND), 1,3-propanesultone (PST), sulfonate cyclic quaternary ammonium salt, trimethylsilyl phosphate (TMSP), or trimethylsilyl borate (TMSB).

In some embodiments, the electrolyte further includes a non-aqueous solvent that can be arbitrarily used as a solvent of the electrolyte.

In some embodiments, the non-aqueous solvent includes, but is not limited to, one or more of the following: cyclic carbonate, linear carbonate, cyclic carboxylate, linear carboxylate, cyclic ether, linear ether, a phosphorus-containing organic solvent, a sulfur-containing organic solvent, and an aromatic fluorine-containing solvent.

In some embodiments, the non-aqueous solvent includes at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methanesulfonate (EMS), or diethyl sulfone (ESE).

The electrolytic salt is not particularly limited. In some embodiments, in a case of the lithium secondary battery, the electrolytic salt includes a lithium salt. An example of the electrolytic salt may include, but is not limited to lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluoro(dioxalato)phosphate (LiDFOP), or lithium tetrafluoro oxalato phosphate (LiTFOP).

The percentage of the electrolytic salt is not particularly limited, provided that the effects of this application are not impaired. In some embodiments, the total molar concentration of lithium in the electrolyte is greater than 0.3 mol/L, greater than 0.4 mol/L, or greater than 0.5 mol/L. In some embodiments, the total molar concentration of lithium in the electrolyte is less than 3 mol/L, less than 2.5 mol/L, or less than 2.0 mol/L. In some embodiments, the total molar concentration of lithium in the electrolyte falls within a range defined by any two of the foregoing values. When the concentration of the electrolytic salt falls within the foregoing range, the amount of lithium as charged particles would not be excessively small, and the viscosity can be controlled within an appropriate range, so as to ensure good conductivity.

3. Negative Electrode

In some embodiments, the negative electrode includes a negative electrode current collector and a negative electrode active substance layer located on one or two surfaces of the negative electrode current collector. The negative electrode active substance layer includes a negative electrode active substance. The negative electrode active substance layer may be one or more layers, and each of the plurality of layers of the negative electrode active substance may include the same or different negative electrode active substances. The negative electrode active substance is any substance capable of reversibly intercalating and deintercalating metal ions such as lithium ions. In some embodiments, a rechargeable capacity of the negative electrode active substance is greater than a discharge capacity of the negative electrode active substance to prevent lithium metal from unexpectedly precipitating onto the negative electrode during charge.

Examples of the negative electrode current collector serving as a current collector maintaining a negative electrode active substance include, but are not limited to metal materials such as aluminum, copper, nickel, stainless steel, and nickel-plated steel. In some embodiments, the negative electrode current collector is copper.

In the case that the negative electrode current collector is made of metal, the negative electrode current collector may take forms including but not limited to a metal foil, a metal cylinder, a metal coil, a metal plate, a metal foil, a sheet metal mesh, a punched metal, a foamed metal, or the like. In some embodiments, the negative electrode current collector is a metal film. In some embodiments, the negative electrode current collector is a copper foil. In some embodiments, the negative electrode current collector is a rolled copper foil based on a rolling method or an electrolytic copper foil based on an electrolytic method.

In some embodiments, a thickness of the negative electrode current collector is greater than 1 μm or greater than 5 μm. In some embodiments, the thickness of the negative electrode current collector is less than 100 μm or less than 50 μm. In some embodiments, the thickness of the negative electrode current collector falls within a range defined by any two of the foregoing values.

The negative electrode active substance is not particularly limited, provided that it can suck and release lithium ions. Examples of the negative electrode active substance may include, but are not limited to carbon materials such as natural graphite and artificial graphite; metals such as silicon (Si) and tin (Sn); or oxides of metal elements such as Si and Sn. The negative electrode active substance may be used alone or in combination.

In some embodiments, the negative electrode active substance layer may further include a negative electrode binder. The negative electrode binder can improve binding between particles of the negative electrode active substance and binding between the negative electrode active substance and the current collector. The type of the negative electrode binder is not particularly limited, provided that its material is stable to the electrolyte or a solvent used in manufacturing of the electrode. In some embodiments, the negative electrode binder includes a resin binder. Examples of the resin binder include, but are not limited to fluororesin, polyacrylonitrile (PAN), polyimide resin, acrylic resin, and polyolefin resin. When a negative electrode mixture slurry is prepared using a water-based solvent, the negative electrode binder includes but is not limited to carboxymethyl cellulose (CMC) or its salt, styrene-butadiene rubber (SBR), polyacrylic acid (PAA) or its salt, or polyvinyl alcohol.

In some embodiments, the negative electrode may be prepared by using the following method: applying a negative electrode mixture slurry including the negative electrode active substance, the resin binder, and the like on the negative electrode current collector, and after drying, and performing rolling to form a negative electrode active substance layer on both sides of the negative electrode current collector, thereby obtaining the negative electrode.

4. Separator

In some embodiments, in order to prevent short circuit, a separator is typically provided between the positive electrode and the negative electrode. In this case, the electrolyte of this application typically infiltrates the separator.

The material and shape of the separator are not particularly limited, provided that the separator does not significantly impair the effects of this application. The separator may be a resin, glass fiber, inorganic substance, or the like that is formed by a material stable to the electrolyte of this application. In some embodiments, the separator includes a porous sheet or nonwoven fabric-like substance having an excellent fluid retention property, or the like. Examples of the material of the resin or glass fiber separator may include, but are not limited to, polyolefin, aromatic polyamide, polytetrafluoroethylene, and polyethersulfone. In some embodiments, the polyolefin is polyethylene or polypropylene. In some embodiments, the polyolefin is polypropylene. The material of the separator may be used alone or in any combination.

The separator may alternatively be a material formed by stacking the foregoing materials, and an example thereof includes, but is not limited to, a three-layer separator formed by stacking polypropylene, polyethylene, and polypropylene in order.

Examples of the material of the inorganic substance may include, but are not limited to, oxides such as aluminum oxide and silicon dioxide, nitrides such as aluminum nitride and silicon nitride, and sulfates (for example, barium sulfate and calcium sulfate). The form of the inorganic substance may include, but is not limited to, a granular or fibrous form.

The form of the separator may be a thin-film form, and examples thereof include, but are not limited to, a nonwoven fabric, a woven fabric, and a microporous film. In the thin-film form, the separator has a pore diameter of 0.01 μm to 1 μm and a thickness of 5 μm to 50 μm. In addition to the standalone thin film-like separator, the following separator may alternatively be used: a separator that is obtained by using a resin-based binder to form a composite porous layer including inorganic particles on the surface of the positive electrode and/or the negative electrode, for example, a separator that is obtained by using fluororesin as a binder to form a porous layer on both surfaces of the positive electrode with alumina particles of which 90% have a particle size less than 1 μm.

The thickness of the separator is random. In some embodiments, the thickness of the separator is greater than 1 μm, greater than 5 μm, or greater than 8 μm. In some embodiments, the thickness of the separator is less than 50 μm, less than 40 μm, or less than 30 μm. In some embodiments, the thickness of the separator falls within a range defined by any two of the foregoing values. When the thickness of the separator falls within the foregoing range, its insulation performance and mechanical strength can be ensured, and the rate performance and energy density of the electrochemical apparatus can be also ensured.

When a porous material such as a porous sheet or a nonwoven fabric is used as the separator, the porosity of the separator is random. In some embodiments, the porosity of the separator is greater than 10%, greater than 15%, or greater than 20%. In some embodiments, the porosity of the separator is less than 60%, less than 50%, or less than 45%. In some embodiments, the porosity of the separator falls within a range defined by any two of the foregoing values. When the porosity of the separator falls within the foregoing range, its insulation performance the mechanical strength can be ensured and film resistance can be suppressed, so that the electrochemical apparatus has good safety performance.

The average pore diameter of the separator is also random. In some embodiments, the average pore diameter of the separator is less than 0.5 μm or less than 0.2 μm. In some embodiments, the average pore diameter of the separator is greater than 0.05 μm. In some embodiments, the average pore diameter of the separator falls within a range defined by any two of the foregoing values. If the average pore diameter of the separator exceeds the foregoing range, a short circuit is likely to occur. When the average pore diameter of the separator falls within the foregoing range, the electrochemical apparatus has good safety performance.

5. Electrochemical Apparatus

The electrochemical apparatus according to this application includes any apparatus in which an electrochemical reaction takes place. Specific examples of the apparatus include all types of primary batteries, secondary batteries, fuel batteries, solar batteries, or capacitors. Especially, the electrochemical apparatus is a lithium secondary battery, including a lithium metal secondary battery or a lithium-ion secondary battery.

This application further provides an electronic apparatus, including the electrochemical apparatus described according to this application.

The electrochemical apparatus of this application is not particularly limited to any purpose, and may be used for any known electronic apparatus in the prior art. In some embodiments, the electrochemical apparatus of this application may be used without limitation in notebook computers, pen-input computers, mobile computers, electronic book players, portable telephones, portable fax machines, portable copiers, portable printers, stereo headsets, video recorders, liquid crystal display televisions, portable cleaners, portable CD players, mini-disc players, transceivers, electronic notebooks, calculators, storage cards, portable recorders, radios, backup power sources, motors, automobiles, motorcycles, motor bicycles, bicycles, lighting appliances, toys, game machines, clocks, electric tools, flash lamps, cameras, large household batteries, lithium-ion capacitors, and the like.

The following uses a lithium-ion battery as an example and describes preparation of the lithium-ion battery with reference to specific examples. A person skilled in the art understands that the preparation method described in this application is only an example, and that all other suitable preparation methods fall within the scope of this application.

EXAMPLES

The following describes performance evaluation performed based on examples and comparative examples of the lithium-ion battery in this application.

I. Preparation of Lithium-Ion Battery

Example 1

1. Preparation of Negative Electrode

Negative electrode active material artificial graphite, thickener carboxymethyl cellulose (CMC) sodium, binder (SBR), and conductive carbon black were mixed in a mass ratio of 95.7:1.0:1.8:1.5, added into a solvent deionized water, and stirred in a vacuum mixer to obtain a negative electrode slurry. The negative electrode slurry was uniformly applied onto a negative electrode current collector copper foil. Then the copper foil was transferred to an oven for drying at 120° C., followed by cold-pressing, and cutting, welding with a tab, to obtain a negative electrode.

2. Preparation of Positive Electrode

First positive electrode material $LiFePO_4$, second positive electrode material $LiMnO_2$, binder PVDF, and conductive carbon black were mixed, added in a mass ratio of 90.4:6.0: 2.1:1.5 into a solvent N-methylpyrrolidone (NMP), and stirred into a uniform transparent system under vacuum, to obtain a positive electrode slurry. The positive electrode slurry was uniformly applied onto a positive electrode current collector aluminum foil. Then the aluminum foil was transferred to an oven for drying at 120° C., followed by cold pressing, slitting, and welding with a tab, to obtain a positive electrode. Based on a total mass of the positive electrode material layer, a percentage of the first positive electrode material $LiFePO_4$ was 90.4% and a percentage of the second positive electrode material $LiMnO_2$ was 6.0%.

3. Preparation of Electrolyte

Ethylene carbonate (EC), ethyl methyl carbonate (EMC), and diethyl carbonate (DEC) were mixed to uniformity in a volume ratio of 1:1:1, to obtain an organic solvent. $LiPF_6$ was dissolved in the foregoing organic solvent to obtain a basic electrolyte, where a concentration of $LiPF_6$ in the basic electrolyte was 1 mol/L. Vinyl carbonate was added into the basic electrolyte and mixed to uniformity to obtain an electrolyte, where based on a total mass of the electrolyte, a percentage of the vinyl carbonate was 3%.

4. Preparation of Separator

A polyethylene porous membrane with an aluminum oxide coating was used as a separator with a thickness of 9 µm.

5. Preparation of Lithium-Ion Battery

The obtained positive electrode, separator, negative electrode were wound in order and placed in an outer packaging foil, with an injection opening left. An electrolyte was injected via the injection opening, followed by processes such as packaging, formation, and capacity grading, to obtain a lithium-ion battery.

Examples 2 to 16

Examples 2 to 16 were different from Example 1 in the type and relevant performance parameter of the positive electrode material and the percentage of the additive in the electrolyte. See Table 1 for details.

Comparative Example 1

Comparative example 1 was different from Example 1 in that the positive electrode material in Comparative example 1 included only $LiFePO_4$.

Comparative Example 2

Comparative example 2 was different from Example 1 in that the positive electrode material in Comparative example 2 included only $LiMnO_2$.

Comparative Examples 3 and 4

Comparative examples 3 and 4 were different from Example 1 in a mass ratio of the first positive electrode material to the second positive electrode material in the positive electrode. See Table 1 for details.

Comparative Examples 5 and 6

Comparative examples 5 and 6 were different from Example 1 in the sheet resistance, compacted density, and single-sided surface density of the positive electrode. See Table 1 for details.

Comparative Examples 7 and 8

Comparative examples 7 and 8 were different from Example 1 in the mass percentage of the vinyl carbonate in the electrolyte. See Table 1 for details.

II. Test Methods

1. Test Method for a Sheet Resistance of a Positive Electrode

A HIOKI BT23562 resistance tester was used to test the sheet resistance of the positive electrode. The test method was as follows: clamping the positive electrode between two conductive terminals of the internal resistance tester, applying pressure to fix the positive electrode, and testing a resistance R of the positive electrode. The diameter of the conductive terminals was 14 mm, the applied pressure was 15 MPa to 27 MPa, and the sampling time range was 5s to 17s.

2. Test Method for High-Temperature Cycling Performance of a Lithium-Ion Secondary Battery At 60° C., the lithium-ion secondary battery was constant-current charged to 4.2 V at a rate of 1 C, constant-voltage charged to a current less than or equal to 0.05 C, and then constant-current discharged to 2.5 V at a rate of 1 C. This was a charge and discharge cycle. A discharge capacity of the lithium-ion secondary battery for the first cycle was recorded. The lithium-ion secondary battery was subjected to charge and discharge recycling according to the foregoing method, a discharge capacity for each cycle was recorded until the discharge capacity of the lithium-ion secondary battery degraded to 80% of a discharge capacity for the first cycle, and the number of charge and discharge cycles at this moment was recorded.

3. Test Method for Rate Performance of the Lithium-Ion Secondary Battery

At 25° C., the lithium-ion secondary battery was constant-current charged to 4.2 V at a rate of 0.5 C, then constant-voltage charged to a current less than or equal to 0.05 C, and then constant-current discharged to 2.5 V at a rate of 0.5 C. A 0.5 C-rate discharge capacity was recorded.

At 25° C., the lithium-ion secondary battery was constant-current charged to 4.2 V at a rate of 0.5 C, then constant-voltage charged to a current less than or equal to 0.05 C, and then constant-current discharged to 2.5 V at a rate of 0.2 C. A 2 C-rate discharge capacity was recorded.

2 C-rate discharge capacity retention rate (%) of lithium-ion secondary battery=2 C-rate discharge capacity/0.5 C-rate discharge capacity×100%.

4. Test Method for Energy Density of the Lithium-Ion Secondary Battery

At 25° C., the lithium-ion secondary battery was constant-current charged to 4.2 V at a rate of 0.2 C, then constant-voltage charged to a current less than or equal to 0.05 C, left standing for 30 min, and then constant-current discharged to 2.5 V at a rate of 0.2 C. A discharge capacity $D_0$ (Ah) and a discharge platform $V_0$ (V) of the lithium-ion secondary battery at 0.2 C rate were recorded. The lithium-ion battery was weighed and its weight was recorded as $m_0$(kg).

The energy density of the lithium-ion secondary battery was calculated according to the following formula:

$$\text{Energy density} = D_0 * V_0/m_0.$$

III. Test Result

Table 1 shows the compositions and relevant performance parameters of the positive electrodes and the types and percentages of the additives in the electrolytes in Comparative examples 1 to 8 and Examples 1 to 16. The percentages of the first and second positive electrode materials were calculated based on the total mass of the positive electrode material layer, and the percentage of the vinyl carbonate in the electrolyte was calculated based on the total mass of the electrolyte.

TABLE 1

| No. | First positive electrode material | Percentage of first positive electrode material (wt %) | Second positive electrode material | Percentage of second positive electrode material (wt %) | Sheet resistance R of positive electrode (Ω) | Compacted density P of positive electrode (g/cm³) | Single-sided surface density Q of positive electrode (g/1540, 25 mm²) | Percentage of vinyl carbonate in electrolyte (wt %) |
|---|---|---|---|---|---|---|---|---|
| Comparative example 1 | LiFePO$_4$ | 96.4 | / | / | 0.6 | 2.2 | 0.28 | 3 |
| Comparative example 2 | / | / | LiMnO$_2$ | 96.4 | 0.6 | 3.4 | 0.28 | 3 |
| Comparative example 3 | LiFePO$_4$ | 96.3 | LiMnO$_2$ | 0.1 | 0.6 | 2.2 | 0.28 | 3 |
| Comparative example 4 | LiFePO$_4$ | 76.4 | LiMnO$_2$ | 20.0 | 0.6 | 2.2 | 0.28 | 3 |
| Comparative example 5 | LiFePO$_4$ | 90.4 | LiMnO$_2$ | 6.0 | 3.5 | 2.6 | 0.16 | 3 |
| Comparative example 6 | LiFePO$_4$ | 90.4 | LiMnO$_2$ | 6.0 | 0.1 | 1.6 | 0.45 | 3 |
| Comparative example 7 | LiFePO$_4$ | 90.4 | LiMnO$_2$ | 6.0 | 0.6 | 2.2 | 0.28 | 0 |
| Comparative example 8 | LiFePO$_4$ | 90.4 | LiMnO$_2$ | 6.0 | 0.6 | 2.2 | 0.28 | 7 |
| Example 1 | LiFePO$_4$ | 90.4 | LiMnO$_2$ | 6.0 | 0.6 | 2.2 | 0.28 | 3 |
| Example 2 | LiFe$_{0.5}$Mn$_{0.5}$PO$_4$ | 90.4 | LiMnO$_2$ | 6.0 | 0.6 | 2.2 | 0.28 | 3 |
| Example 3 | Li$_{0.9}$Fe$_{0.5}$Mn$_{0.45}$Ti$_{0.05}$PO$_4$ | 90.4 | LiMnO$_2$ | 6.0 | 0.6 | 2.2 | 0.28 | 3 |
| Example 4 | Li$_{0.9}$Fe$_{0.5}$Mn$_{0.45}$Ti$_{0.04}$Zr$_{0.01}$PO$_4$ | 90.4 | LiMnO$_2$ | 6.0 | 0.6 | 2.2 | 0.28 | 3 |
| Example 5 | Li$_{0.95}$FePO$_{3.95}$F$_{0.05}$ | 90.4 | LiMnO$_2$ | 6.0 | 0.6 | 2.2 | 0.28 | 3 |
| Example 6 | LiFePO$_4$ | 90.4 | LiMn$_{0.9}$Ni$_{0.1}$O$_2$ | 6.0 | 0.6 | 2.2 | 0.28 | 3 |
| Example 7 | LiFePO$_4$ | 90.4 | LiMn$_{0.9}$Ni$_{0.05}$Cr$_{0.05}$O$_2$ | 6.0 | 0.6 | 2.2 | 0.28 | 3 |
| Example 8 | LiFePO$_4$ | 90.4 | Li$_{0.95}$MnO$_{1.95}$F$_{0.05}$ | 6.0 | 0.6 | 2.2 | 0.28 | 3 |
| Example 9 | LiFePO$_4$ | 90.4 | Li$_{0.95}$MnO$_{1.9}$S$_{0.05}$F$_{0.05}$ | 6.0 | 0.6 | 2.2 | 0.28 | 3 |
| Example 10 | LiFePO$_4$ | 93.4 | LiMnO$_2$ | 3.0 | 0.6 | 2.2 | 0.28 | 3 |
| Example 11 | LiFePO$_4$ | 86.4 | LiMnO$_2$ | 10.0 | 0.6 | 2.2 | 0.28 | 3 |
| Example 12 | LiFePO$_4$ | 90.4 | LiMnO$_2$ | 6.0 | 0.1 | 2.4 | 0.36 | 3 |
| Example 13 | LiFePO$_4$ | 90.4 | LiMnO$_2$ | 6.0 | 0.8 | 2.2 | 0.20 | 3 |
| Example 14 | LiFePO$_4$ | 90.4 | LiMnO$_2$ | 6.0 | 1.7 | 1.7 | 0.19 | 3 |

TABLE 1-continued

| No. | First positive electrode material | Percentage of first positive electrode material (wt %) | Second positive electrode material | Percentage of second positive electrode material (wt %) | Sheet resistance R of positive electrode ($\Omega$) | Compacted density P of positive electrode (g/cm$^3$) | Single-sided surface density Q of positive electrode (g/1540, 25 mm$^2$) | Percentage of vinyl carbonate in electrolyte (wt %) |
|---|---|---|---|---|---|---|---|---|
| Example 15 | LiFePO$_4$ | 90.4 | LiMnO$_2$ | 6.0 | 0.6 | 2.2 | 0.28 | 0.05 |
| Example 16 | LiFePO$_4$ | 90.4 | LiMnO$_2$ | 6.0 | 0.6 | 2.2 | 0.28 | 4.5 |

Note:
"/" means that the substance is not applicable.

Table 2 shows the high-temperature cycling performance, rate performance, and energy densities of the lithium-ion secondary batteries in Comparative examples 1 to 8 and Examples 1 to 16.

TABLE 2

| No. | R · P/Q | Cycles at high temperature | Rate performance (%) | Energy density (Wh/Kg) |
|---|---|---|---|---|
| Comparative example 1 | 4.71 | 1450 | 98.4 | 162 |
| Comparative example 2 | 7.29 | 1 | 81.2 | 151 |
| Comparative example 3 | 4.71 | 1487 | 98.3 | 163 |
| Comparative example 4 | 4.71 | 2212 | 86.3 | 159 |
| Comparative example 5 | 56.9 | 1642 | 93.2 | 113 |
| Comparative example 6 | 0.36 | 1792 | 94.4 | 170 |
| Comparative example 7 | 4.71 | 1128 | 98.3 | 171 |
| Comparative example 8 | 4.71 | 2131 | 96.9 | 171 |
| Example 1 | 4.71 | 2398 | 97.5 | 172 |
| Example 2 | 4.71 | 2417 | 97.4 | 190 |
| Example 3 | 4.71 | 2432 | 97.6 | 190 |
| Example 4 | 4.71 | 2459 | 97.9 | 191 |
| Example 5 | 4.71 | 2325 | 97.4 | 172 |
| Example 6 | 4.71 | 2392 | 97.1 | 173 |
| Example 7 | 4.71 | 2298 | 97.4 | 171 |
| Example 8 | 4.71 | 2312 | 97.1 | 170 |
| Example 9 | 4.71 | 2348 | 97.0 | 172 |
| Example 10 | 4.71 | 2036 | 98.0 | 168 |
| Example 11 | 4.71 | 2728 | 96.5 | 175 |
| Example 12 | 0.67 | 2322 | 97.6 | 181 |
| Example 13 | 8.80 | 2286 | 97.5 | 163 |
| Example 14 | 15.2 | 2285 | 97.7 | 161 |
| Example 15 | 4.71 | 2201 | 97.8 | 172 |
| Example 16 | 4.71 | 2425 | 97.4 | 171 |

It can be known from comparison between the foregoing examples and comparative examples that compared with the lithium-ion batteries having a positive electrode including only the first positive electrode material or the second positive electrode material, the lithium-ion batteries having a positive electrode with both the first positive electrode material and the second positive electrode material show significant improvement of high-temperature cycling performance and increase in energy density but no significant change of the rate performance. Thus, it can be known that the use of both the first positive electrode material and the second positive electrode material can cause a synergistic effect. Without theoretical constraints, a synergistic effect may be caused by the following reasons: First, the surface of the second positive electrode material used in this application has a quite small amount of free lithium, and the addition thereof into the positive electrode allows for good stability of the slurry and good processing performance. Second, the second positive electrode material used in this application has a high specific capacity and low initial coulombic efficiency during the first charge and can better compensate for active lithium loss caused by the formed SEI. During discharge, more lithium ions are intercalated back into the first positive electrode material lattice, effectively increasing the energy density of the lithium-ion secondary battery. Third, the first positive electrode material has a stable structure and good cycling performance, and as the sheet resistance R, the compacted density P, and the single-sided surface density Q of the positive electrode are controlled in the ranges of this application, the lithium-ion secondary battery can have good cycling performance and rate performance.

In addition, it can be seen from the comparison results between Comparative example 7 and Example 1 that the vinyl carbonate added into the electrolyte can exert a synergistic effect with the positive electrode including both the first positive electrode material and the second positive electrode material. This may be because during the first charge, a large amount of active lithium released from the second positive electrode material is intercalated into the negative electrode, further reducing actual potential of the negative electrode, causing continuous reduction of the solvent in the electrolyte, and affecting the cycling performance. The use of the additive vinyl carbonate can induce formation of a denser and thinner SEI film, preventing the continuous consumption of the electrolyte.

References to "some embodiments", "some of the embodiments", "an embodiment", "another example", "examples", "specific examples", or "some examples" in this specification mean the inclusion of specific features, structures, materials, or characteristics described in at least one embodiment or example of this application in this embodiment or example. Therefore, descriptions in various places throughout this specification, such as "in some embodiments", "in the embodiments", "in an embodiment", "in another example", "in an example", "in a specific example", or "examples" do not necessarily refer to the same embodiment or example in this application. In addition, a specific feature, structure, material, or characteristic herein may be combined in any appropriate manner in one or more embodiments or examples.

Although illustrative embodiments have been demonstrated and described, a person skilled in the art should understand that the foregoing embodiments are not to be construed as limiting this application, and that some embodiments may be changed, replaced, and modified without departing from the spirit, principle, and scope of this application.

What is claimed is:

1. An electrochemical apparatus, comprising a positive electrode, a negative electrode, and an electrolyte; wherein the positive electrode comprises a positive electrode current collector and a positive electrode material layer on at least one surface of the positive electrode current collector, and the positive electrode material layer comprises a first positive electrode material shown in Formula (I):

$$Li_{1+x}Fe_yMn_zM_{1-y-z}PO_{4-t}A_t, \quad \text{Formula (I)}$$

wherein
−0.1<x<0.1, 0<y≤1, 0≤z≤1, 0<y+z≤1, 0≤t<0.2, M comprises at least one of Ti, Zr, V, or Cr, and A comprises at least one of S, N, F, Cl, or Br; and
a second positive electrode material shown in Formula (II);

$$Li_{1+r}Mn_{1-p}X_pO_{2-s}T_s, \quad \text{Formula (II)}$$

wherein
−0.1<r<0.2, 0≤p<0.2, 0≤s<0.2, X comprises at least one of Fe, Co, Ni, Ti, Zn, Mg, Al, V, Cr, or Zr, and T comprises at least one of S, N, F, Cl, or Br; and
the positive electrode satisfies $$0.5 \le R \times P/Q \le 16,$$

wherein
R is a numerical value representing a resistance of the positive electrode (in Ω); P is a numerical value representing a compacted density of the positive electrode (in g/cm³); and Q is a numerical value representing a single-sided surface density of the positive electrode (in g/mm²),
wherein Q is calculated according to Q=1540.25×m/Ar, where m is a numerical value representing a mass of the positive active material layer (in g), and Ar is a numerical value representing an area of the positive active material layer (in mm²).

2. The electrochemical apparatus according to claim 1, wherein 1.5≤R×P/Q≤10.

3. The electrochemical apparatus according to claim 1, wherein R≤3.5.

4. The electrochemical apparatus according to claim 1, wherein 1.6<P<2.6.

5. The electrochemical apparatus according to claim 1, wherein 0.16<Q<0.45.

6. The electrochemical apparatus according to claim 1, wherein a mass ratio of the first positive electrode material to the second positive electrode material is 5:1 to 99:1.

7. The electrochemical apparatus according to claim 1, wherein based on a total mass of the positive electrode material layer, a percentage of the first positive electrode material is 80% to 98%.

8. The electrochemical apparatus according to claim 1, wherein the second positive electrode material has a characteristic diffraction peak A in an X-ray diffraction pattern in a range of 15° to 16° and/or a characteristic diffraction peak B in a range of 18° to 19°, and a ratio of $I_A/I_B$ of an intensity $I_A$ of the characteristic diffraction peak A to an intensity $I_B$ of the characteristic diffraction peak B satisfies 0<$I_A/I_B$≤0.2.

9. The electrochemical apparatus according to claim 8, wherein in the X-ray diffraction pattern of the second positive electrode material after a first cycle of charge, the characteristic diffraction peak A and the characteristic diffraction peak B both shift toward lower angles, with a shift magnitude less than 0.5°.

10. The electrochemical apparatus according to claim 1, wherein the first positive electrode material comprises at least one of $LiFePO_4$, $LiFe_{0.5}Mn_{0.5}PO_4$, $Li_{0.9}Fe_{0.5}Mn_{0.45}Ti_{0.05}PO_4$, $Li_{0.9}Fe_{0.5}Mn_{0.45}Ti_{0.04}Zr_{0.01}PO_4$, or $Li_{0.95}FePO_{3.95}F_{0.05}$; and/or the second positive electrode material comprises at least one of $LiMnO_2$, $LiMn_{0.9}Ni_{0.1}O_2$, $LiMn_{0.9}Ni_{0.05}Cr_{0.05}O_2$, $Li_{0.95}MnO_{1.95}F_{0.05}$, or $Li_{0.95}MnO_{1.9}S_{0.05}F_{0.05}$, (in g/cm³); and Q is a numerical value representing a single-sided surface density of the positive electrode (in g/mm²),
wherein Q is calculated according to Q=1540.25×m/Ar, where m is a numerical value representing a mass of the positive active material layer (in g), and Ar is a numerical value representing an area of the positive active material layer (in mm²).

11. The electrochemical apparatus according to claim 1, wherein the electrolyte comprises vinyl carbonate; wherein based on a total mass of the electrolyte, a percentage of the vinyl carbonate is 0.05% to 5%.

12. An electronic apparatus, comprising an electrochemical apparatus, the electrochemical apparatus comprises a positive electrode, a negative electrode, and an electrolyte, wherein
the positive electrode comprises a positive electrode current collector and a positive electrode material layer on at least one surface of the positive electrode current collector, and the positive electrode material layer comprises a first positive electrode material shown in Formula (I):

$$Li_{1+x}Fe_yMn_zM_{1-y-z}PO_{4-t}A_t, \quad \text{Formula (I)}$$

wherein
−0.1<x<0.1, 0<y≤1, 0≤z≤1, 0<y+z≤1, 0≤t<0.2, M comprises at least one of Ti, Zr, V, or Cr, and A comprises at least one of S, N, F, Cl, or Br; and
a second positive electrode material shown in Formula (II);

$$Li_{1+r}Mn_{1-p}X_pO_{2-s}T_s, \quad \text{Formula (II)}$$

wherein
−0.1<r<0.2, 0≤p<0.2, 0≤s<0.2, X comprises at least one of Fe, Co, Ni, Ti, Zn, Mg, Al, V, Cr, or Zr, and T comprises at least one of S, N, F, Cl, or Br; and
the positive electrode satisfies Formula (1):

$$0.5 \le R \times P/Q \le 16, \quad \text{Formula (1)}$$

wherein
R is a numerical value representing a resistance of the positive electrode (in $\Omega$); P is a numerical value representing a compacted density of the positive electrode (in $g/cm^3$); and Q is a numerical value representing a single-sided surface density of the positive electrode (in $g/mm^2$),
wherein Q is calculated according to $Q=1540.25 \times m/Ar$, where m is a numerical value representing a mass of the positive active material layer (in g), and Ar is a numerical value representing an area of the positive active material layer (in $mm^2$).

13. The electronic apparatus according to claim 12, wherein $1.5 \leq R \times P/Q \leq 10$.

14. The electronic apparatus according to claim 12, wherein $R \leq 3.5$.

15. The electronic apparatus according to claim 12, wherein $1.6 < P < 2.6$.

16. The electronic apparatus according to claim 12, wherein $0.16 < Q < 0.45$.

17. The electronic apparatus according to claim 12, wherein a mass ratio of the first positive electrode material to the second positive electrode material is 5:1 to 99:1.

18. The electronic apparatus according to claim 12, wherein based on a total mass of the positive electrode material layer, a percentage of the first positive electrode material is 80% to 98%.

19. The electronic apparatus according to claim 12, wherein the first positive electrode material comprises at least one of $LiFePO_4$, $LiFe_{0.5}Mn_{0.5}PO_4$, $Li_{0.9}Fe_{0.5}Mn_{0.45}Ti_{0.05}PO_4$, $Li_{0.9}Fe_{0.5}Mn_{0.45}Ti_{0.04}Zr_{0.01}PO_4$, or $Li_{0.95}FePO_{3.95}F_{0.05}$; and/or the second positive electrode material comprises at least one of $LiMnO_2$, $LiMn_{0.9}Ni_{0.1}O_2$, $LiMn_{0.9}Ni_{0.05}Cr_{0.05}O_2$, $Li_{0.95}MnO_{1.95}F_{0.05}$, or $Li_{0.95}MnO_{1.9}S_{0.05}F_{0.05}$.

20. The electronic apparatus according to claim 12, wherein the electrolyte comprises vinyl carbonate; wherein based on a total mass of the electrolyte, a percentage of the vinyl carbonate is 0.05% to 5%.

* * * * *